(12) United States Patent
Morris

(10) Patent No.: US 10,864,466 B2
(45) Date of Patent: Dec. 15, 2020

(54) DRAIN PROTECTION

(71) Applicant: Ertec Environmental Systems LLC, Alameda, CA (US)

(72) Inventor: Vincent P. Morris, Alameda, CA (US)

(73) Assignee: Ertec Environmental Systems LLC, Alameda, CA (US)

( * ) Notice: Subject to any disclaimer, the term of this patent is extended or adjusted under 35 U.S.C. 154(b) by 508 days.

(21) Appl. No.: 15/285,430

(22) Filed: Oct. 4, 2016

(65) Prior Publication Data

US 2018/0230688 A1    Aug. 16, 2018

(51) Int. Cl.
*E03F 5/04* (2006.01)
*B01D 29/00* (2006.01)
*E03F 5/06* (2006.01)

(52) U.S. Cl.
CPC ............ *B01D 29/0095* (2013.01); *E03F 5/06* (2013.01); *B01D 2201/34* (2013.01)

(58) Field of Classification Search
CPC ............................. E03F 5/0403; E03F 5/0404
USPC ....................................... 404/2, 4, 5; 210/163
See application file for complete search history.

(56) References Cited

U.S. PATENT DOCUMENTS

| | | |
|---|---|---|
| 929,728 A | 8/1909 | Taylor |
| 1,618,288 A | 2/1927 | Kinzie |
| 2,341,515 A | 2/1944 | Reyfeid |
| 3,112,262 A | 11/1963 | Parkinson |
| 3,455,112 A | 7/1969 | Twele |
| 4,049,551 A * | 9/1977 | Otzen ............... A47J 47/20 134/111 |
| 4,279,535 A | 7/1981 | Gagliardi |
| 4,301,996 A | 11/1981 | Holyoak |
| 4,721,408 A | 1/1988 | Hewlett |
| 4,804,299 A | 2/1989 | Forte |
| 4,854,773 A | 8/1989 | Nicoll |
| 5,108,224 A | 4/1992 | Cabiniss |
| 5,157,867 A | 10/1992 | Fritch |
| 5,257,878 A | 11/1993 | Peterson |
| 5,338,131 A | 8/1994 | Bestmann |
| 5,372,714 A * | 12/1994 | Logue, Jr. ............ E03F 5/0404 210/163 |
| 5,575,584 A | 11/1996 | Hsu |
| 5,584,600 A | 12/1996 | Langdon |
| 5,605,416 A | 2/1997 | Roach |
| 5,633,888 A | 5/1997 | Chinn et al. |
| 5,641,243 A | 6/1997 | Hsu |

(Continued)

FOREIGN PATENT DOCUMENTS

| | | |
|---|---|---|
| CA | 2533232 | 7/2006 |
| GB | 2171131 | 8/1986 |

(Continued)

*Primary Examiner* — Thomas B Will
*Assistant Examiner* — Katherine J Chu
(74) *Attorney, Agent, or Firm* — T.H.P. Richardson

(57) ABSTRACT

A protected drain assembly comprising a drain which is at least partially bordered by a hard surface, and which is protected by a drain cover assembly which comprises
(A) a laminar sheet which (i) is on top of the drain and (ii) comprises a central portion which, when a sediment-containing liquid is placed on top of it, allows the liquid to pass through it, and
(B) gaskets which (i) are attached to edges of the laminar sheet and (ii) secure the edges of the laminar sheet to the hard surface.

20 Claims, 4 Drawing Sheets

(56) References Cited

U.S. PATENT DOCUMENTS

| | | | |
|---|---|---|---|
| 5,725,782 A * | 3/1998 | Chinn | B01D 29/05 |
| | | | 210/164 |
| 5,733,825 A | 3/1998 | Martin et al. | |
| 5,944,443 A | 8/1999 | Benedict | |
| 5,948,250 A * | 9/1999 | Middleton | C02F 1/40 |
| | | | 210/232 |
| 5,954,451 A | 9/1999 | Presby | |
| 5,954,952 A | 9/1999 | Strawser | |
| 6,010,622 A * | 1/2000 | Chinn | B01D 29/05 |
| | | | 210/164 |
| 6,017,166 A | 1/2000 | Mossburg | |
| 6,109,835 A | 8/2000 | Grabhorn | |
| 6,214,216 B1 | 4/2001 | Isaacson | |
| 6,274,036 B1 * | 8/2001 | Ellis | B01D 29/27 |
| | | | 210/164 |
| 6,277,473 B1 | 8/2001 | McGinn | |
| 6,332,737 B1 | 12/2001 | Mattson | |
| 6,422,787 B1 | 7/2002 | Mikell | |
| 6,497,532 B1 | 12/2002 | McGinn | |
| 6,505,996 B1 | 1/2003 | Ianello et al. | |
| 6,537,446 B1 * | 3/2003 | Sanguinetti | E03F 1/00 |
| | | | 210/163 |
| 6,547,493 B2 | 4/2003 | Spangler et al. | |
| 6,551,505 B2 | 4/2003 | Chinn et al. | |
| 6,641,335 B1 | 11/2003 | Allard | |
| 6,709,579 B1 | 3/2004 | Singleton et al. | |
| 6,733,209 B2 | 5/2004 | Allard | |
| 6,808,623 B2 * | 10/2004 | Harris | E03F 5/0404 |
| | | | 210/164 |
| 16,811,708 | 11/2004 | Shaw et al. | |
| 6,848,866 B1 * | 2/2005 | McGinn | E02B 3/04 |
| | | | 210/170.03 |
| 6,872,029 B2 * | 3/2005 | Allard | B01D 29/27 |
| | | | 405/36 |
| 6,905,289 B1 * | 6/2005 | Sanguinetti | E02B 3/108 |
| | | | 405/107 |
| 6,929,425 B1 | 8/2005 | Kimberlin et al. | |
| 6,974,540 B1 | 12/2005 | Fleischman | |
| 7,008,144 B2 | 3/2006 | McGinn | |
| 7,070,691 B2 * | 7/2006 | Lindemulder | E03F 1/00 |
| | | | 210/164 |
| 7,096,627 B2 * | 8/2006 | Wade | E04D 13/0645 |
| | | | 137/357 |
| 7,131,787 B2 * | 11/2006 | McGinn | E03F 5/0404 |
| | | | 405/36 |
| 7,172,372 B2 | 2/2007 | McGinn | |
| 7,396,471 B2 * | 7/2008 | Wimberger | E03F 1/00 |
| | | | 210/163 |
| 7,399,411 B2 * | 7/2008 | DeAngelis | C02F 1/28 |
| | | | 210/242.4 |
| 7,481,921 B2 * | 1/2009 | Kent | E03F 1/00 |
| | | | 210/164 |
| 7,524,414 B1 * | 4/2009 | Barragan | E03F 1/00 |
| | | | 210/163 |
| 7,544,016 B2 * | 6/2009 | McGinn | B01D 21/0012 |
| | | | 405/302.6 |
| 7,549,820 B1 * | 6/2009 | Happel | E03F 1/00 |
| | | | 210/163 |
| D612,018 S * | 3/2010 | Howard | D23/261 |
| 7,771,591 B2 * | 8/2010 | Lucas | E03F 1/00 |
| | | | 210/163 |
| 7,955,030 B2 | 6/2011 | McGinn et al. | |
| 8,017,004 B2 * | 9/2011 | Crumpler | E03F 5/0404 |
| | | | 210/155 |
| 8,043,498 B2 * | 10/2011 | Rueda | E03F 1/00 |
| | | | 210/164 |
| 8,051,568 B2 * | 11/2011 | Moody | E03F 1/00 |
| | | | 210/164 |
| 8,099,909 B2 * | 1/2012 | Bottriell | E04D 13/076 |
| | | | 210/162 |
| 8,206,060 B2 * | 6/2012 | Maggioni | E01C 3/00 |
| | | | 404/70 |
| 8,402,630 B2 | 3/2013 | McGinn et al. | |
| 10,167,620 B2 * | 1/2019 | Zock | E02B 3/106 |
| 10,407,891 B1 * | 9/2019 | Sanguinetti | E03F 5/0403 |
| 10,704,247 B2 * | 7/2020 | Zock | B01D 29/05 |
| 2001/0023842 A1 * | 9/2001 | Singleton | B01D 29/15 |
| | | | 210/163 |
| 2002/0020658 A1 | 2/2002 | Isaacson | |
| 2002/9172564 | 11/2002 | Brown | |
| 2003/0005833 A1 | 5/2003 | Janz | |
| 2003/0143026 A1 | 7/2003 | Santha | |
| 2005/0089376 A1 | 4/2005 | Maxwell | |
| 2006/0226406 A1 | 10/2006 | Vise | |
| 2007/0138074 A1 * | 6/2007 | Howard | E03F 5/0404 |
| | | | 210/163 |
| 2007/0218789 A1 * | 9/2007 | Maggioni | D04H 3/045 |
| | | | 442/2 |
| 2007/0280789 A1 | 12/2007 | Mason | |
| 2008/0157044 A1 | 7/2008 | Barfield | |
| 2008/0290042 A1 * | 11/2008 | Hanson | E03F 1/00 |
| | | | 210/747.3 |
| 2010/0154347 A1 | 6/2010 | Jessen | |
| 2011/0311318 A1 | 12/2011 | Taylor | |

FOREIGN PATENT DOCUMENTS

| | | | |
|---|---|---|---|
| WO | WO 2007/005895 | 1/2007 | |
| WO | WO-2019161389 A1 * | 8/2019 | C02F 1/285 |

\* cited by examiner

DRAIN PROTECTION

CROSS-REFERENCE TO RELATED APPLICATIONS

This application is related to U.S. Pat. Nos. 6,848,866, 7,008,144 7,131,787, 7,172,372, 7,554,016, 7,955,030 and 8,402,630 and to U.S. patent application Ser. No. 14/279,977, filed May 16, 2014. The entire disclosure of each of those patents and that application is incorporated by reference herein for all purposes.

BACKGROUND OF THE INVENTION

This invention relates to assemblies and methods for protecting drains.

SUMMARY OF THE INVENTION

In a first aspect, this invention provides a drain cover assembly which can be placed over a drain in the road and which comprises
  (A) a self-supporting laminar sheet which comprises
    (1) a central portion comprising apertures which allow water to pass through the central portion,
    (2) a first side edge portion which contacts and extends from one side of the central portion,
    (3) a second edge portion which contacts and extends from an opposite side of the central portion,
    (4) a front edge portion which (i) contacts and extends from a front edge of the central portion and (ii) is attached to the first and second edge portions, and
    (5) a rear edge portion which (i) contacts and extends from a rear edge of the central portion and (ii) is attached to the first and second edge portions;
  (B) a first side edge gasket which (i) comprises an inner gasket portion which contacts and lies over or under the first side edge portion of the laminar sheet and (ii) an outer gasket portion which extends away from the first side edge portion of the laminar sheet; and
  (C) a second side edge gasket which (i) comprises an inner gasket portion which contacts and lies over or under the second side edge portion of the laminar sheet and (ii) an outer gasket portion which extends away from the second side edge portion of the laminar sheet.

In a first embodiment of the first aspect of the invention, the drain cover assembly (i) is particularly useful for protecting a long thin drain, and (ii) includes only the first side edge gasket and the second side edge gasket, each of the gaskets extending beyond the end of the laminar sheet. In this use, the central portion of the laminar sheet extends beyond the ends of the drain.

In a second embodiment of the first aspect of the invention, the drain cover assembly (i) is particularly useful for protecting a drain which (a) is rectangular, with substantial width and length, (b) has cross members which support the laminar sheet and (c) is bordered on all sides by a roadway, parking lot, service yard, floor of a waste management transfer station or industrial production facility, or other hard surface. For this use, the drain cover assembly comprises, in addition to the first and second side edge gaskets,
  (D) a front edge gasket which (i) comprises an inner gasket portion which contacts and lies over or under the front edge portion of the laminar sheet, (ii) comprises an outer gasket portion which extends away from the front edge portion of the laminar sheet and (iii) contacts the first side edge gasket and the second side edge gasket;
  (E) a rear edge gasket which (i) comprises an inner gasket portion which contacts and lies over or under the rear edge portion of the laminar sheet, (ii) comprises an outer gasket portion which extends away from the front edge portion of the laminar sheet and (iii) contacts the first side edge gasket and the second side edge gasket.

In a third embodiment of the first aspect of the invention, the drain cover assembly is particularly useful for protecting a drain which (a) is rectangular, with substantial width and length, (b) has cross members which support the laminar sheet, (c) is bordered by a roadway or other hard surface on the front and on each side, and (d) has a rear section which is an opening in a curb of a sidewalk. For this use, the drain cover assembly comprises, in addition to the first and second side edge gaskets,
  (D) a front edge gasket which (i) comprises an inner gasket portion which contacts and lies over or under the front edge portion of the laminar sheet, (ii) comprises an outer gasket portion which extends away from the front edge portion of the laminar sheet and (iii) contacts the first side edge gasket and the second side edge gasket.

In this use, the laminar sheet has a rear edge portion which is not covered by the side edge gaskets and which extends upwards from the central portion of the laminar sheet to cover at least part of the opening in the curb of the sidewalk. The rear edge portion will normally be created by bending the laminar sheet before the gaskets are secured to the horizontal portion of the laminar sheet.

In a second aspect, this invention provides a protected drain assembly which comprises
  (1) a drain which is bordered on at least three sides by a hard surface, and
  (2) a drain cover assembly according to the first aspect of the invention, wherein (a) at least part of the central portion of the laminar sheet lies over the drain, (b) at least part of the inner gasket portion of the first side edge gasket is over the drain or over a part of the hard surface which borders the drain, (c) at least part of the outer gasket portion of the first side edge gasket contacts a part of the hard surface which borders the drain, and (d) at least part of the inner gasket portion of the second side edge gasket is over the drain or over a part of the hard surface which borders the drain, and (e) at least part of the outer gasket portion of the second side edge gasket contacts the hard surface which borders the drain.

In a third aspect this invention provides a method of preparing a protected drain assembly comprising a drain which is at least partially bordered by a hard surface, the method comprising
  (A) placing over the drain a self-supporting laminar sheet which comprises
    (1) a central portion comprising apertures which allow water to pass through the central portion,
    (2) a first side edge portion which contacts and extends from one side of the central portion,
    (3) a second edge portion which contacts and extends from an opposite side of the central portion,
    (4) a front edge portion which (i) contacts and extends from a front edge of the central portion and (ii) is attached to the first and second edge portions,
    (5) a rear edge portion which (i) contacts and extends from a rear edge of the central portion and (ii) is attached to the first and second edge portions;
  and
  (B) before or after step (A), providing gaskets which (i) are attached to at least two edges of the laminar sheet and (ii) secure the edges of the laminar sheet to the hard surface.

In a fourth aspect, this invention provides a gasket which is suitable for use in the drain cover assemblies of the first aspect of the invention and which is a strip of a porous nonwoven fabric, preferably a melt blown polymeric fabric, which has been folded lengthwise so that it comprises (A) an inner gasket portion, (B) an outer gasket portion which is coplanar with the inner gasket portion, and (C) a berm which extends upwards from the inner and outer gasket portions.

The gasket is preferably formed by (1) folding the strip of the fabric lengthways, (2) sewing a lengthways seam between the two sides of the fabric, with the distance of the seam from the tip of the fold determining the height of the berm, and (3) flattening the strip of fabric.

BRIEF DESCRIPTION OF THE DRAWINGS

The invention is illustrated in the accompanying drawings which are diagrammatic sketches and are not to scale, and in which.

DETAILED DESCRIPTION OF THE INVENTION

Figure 1:
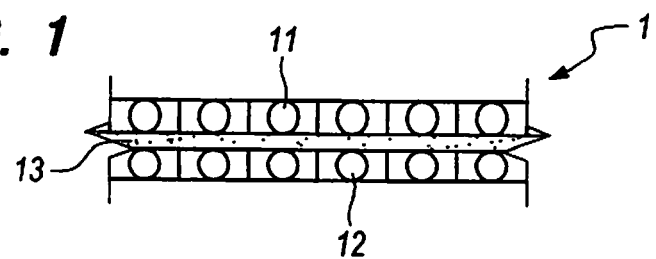
FIG. 1 is a partial cross-section of a laminar sheet for use in some embodiments of the invention.

In the Summary of the Invention above, the Detailed Description of the Invention, the Examples, and the claims below, and in the accompanying drawings, reference is made to particular features of the invention, including for example components, ingredients, devices, apparatus, systems, test results and steps. It is to be understood that the disclosure of the invention in this specification includes all possible combinations of such particular features. For example, where a particular feature is disclosed in the context of a particular mode, aspect, embodiment, Figure or claim, that feature can also be used, to the extent possible, in the context of any other particular mode, aspect, embodiment, Figure or claim, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, the drain cover assembly defined above which comprises the specified components (A), (B) and (C) can consist of those specified components or can also contain other components, for example the specified components (D) and (E), or other non-specified components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. When, in this specification, a range is given as "(a first number) to (a second number)" or "(a first number)-(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

When reference is made herein to a component being on one side, or at the front, or at the rear, or upwards or downwards, of an assembly, the reference is to the assembly in the horizontal position.

The Self-Supporting Laminar Sheet.

At least part, and preferably all, of the self-supporting laminar sheet comprises one or more apertured sheet materials in which the apertures allow liquid to pass through the laminar sheet. In some embodiments, the whole of the laminar sheet consists of (1) a single apertured polymeric sheet, or (2) two or more apertured polymeric sheet materials which are joined together. The size of the apertures in the apertured polymeric sheet material is preferably such that solids entrained in the liquid, e.g. debris, leaves, twigs and other materials having a similar or greater size, do not pass through the laminar sheet into the drain.

The apertured polymeric sheet material can for example have one or more of the following optional characteristics.

(1) In each sheet material, the apertures have the same size and/or shape.

(2) In each sheet material, each of the apertures has an area of 0.01 to 1.0 in.$^2$, preferably 0.02 to 0.25 in.$^2$, and/or a minimum dimension of 0.1 to 1.0, preferably 0.15 to 0.5, inch.

(3) The sheet material is composed of (a) a first set of polymeric strands (i) which are parallel to each other and (ii) are spaced apart from each other with a distance between adjacent strands of 0.1-1.0, e.g. 0.1 to 0.3 inch, and (b) a second set of polymeric strands (i) which are parallel to each other and at an angle of 30 to 90° to the first strands, (ii) which are bonded to the first strands of crossover points, and (iii) which are spaced apart from each other with a distance between adjacent strands of 0.1-1.0, e.g. 0.1 to 0.3 inch. The first and second polymeric strands can have a thickness in the laminar dimension of the sheet direction of the sheet between the crossover points of 0.04 to 0.5 inch.

(4) The sheet material is composed of a polymeric composition (i.e. a composition which contains a polymer and conventional additives such as fillers) which can be melt shaped, which does not absorb substantial amounts of water and which can be recycled, for example a composition based on a polyolefin, particularly high density polyethylene or polypropylene.

(5) The sheet material has a tensile strength in the machine direction of at least 400 pounds (ASTM D 4595) and in the transverse direction of at least 325 pounds (ASTM D4595).

(6) The solid surface area of the sheet material is 10 to 80%, for example 25 to 65%, of its total area, both areas being viewed at right angles to the sheet material Additional details of suitable sheet materials are disclosed in U.S. Pat. Nos. 6,848,868, 8,402,630 and the other US patents which are incorporated herein by reference.

In some embodiments, at least part of the self-supporting laminar sheet also comprises an additional apertured sheet material in which the apertures have a size less than the apertures in the polymeric sheet material. The additional apertured sheet material can act as a filter material so that, when a sediment-containing liquid is placed on top of the sheet, the liquid can pass through it but at least some of the sediment (although it can pass through the apertured polymeric sheet material) is retained by the filter material. The additional sheet material can also be engineered so that it reduces the amount of other organic matter and chemicals, including hydrocarbons and aluminum, entering the drain.

When the self-supporting laminar sheet includes an additional sheet material which acts as a filter, it is possible that in some circumstances, the area of the self-supporting laminar sheet which includes the additional sheet material will become clogged by sediment and debris so that the drain ceases to function efficiently. To avoid this happening, it is often desirable, when the self-supporting laminar sheet includes an additional sheet which acts as a filter, for at least part of the self-supporting laminar sheet to be free of the additional filter material, so that water can pass freely into the drain through that part of the laminar sheet.

In one embodiment, the laminar sheet comprises (i) a first sheet material which has relatively large apertures therethrough, (ii) a second sheet material which has relatively large apertures therethrough and which may be the same as or different from the first sheet material, and (iii) sandwiched between the first and second sheet materials, an additional sheet material having relatively small apertures therethrough. The additional sheet material can extend over part or all of the area of the laminar sheet.

The additional sheet material, which has relatively small apertures therein and which, in use, acts as a filter for sediment, can for example have one or more of the following optional characteristics.

(1) The third sheet material has a mesh size (measured by ASTM E-11) of 80 to 600 μm, preferably 100 to 500 μm, (2) The third sheet material has a substantially uniform thickness of less than 0.5 inch, or less than 0.25 inch, for example 0.01-0.06, preferably 0.01-0.04 inch.

(3) The third sheet material is composed of a polymeric composition (i.e. a composition which contains a polymer and conventional additives such as fillers) which does not absorb substantial amounts of water, and which can be recycled in the same batch as the first and second sheet materials, for example a composition based on a polyolefin, particularly high density polyethylene or polypropylene.

(4) The third sheet material, in tests in which clean water is passed through the third sheet material, on its own, is capable of passing at least 100, e.g. at least 200, gallons of water per square foot per minute, but not more than 600, e.g. not more than 400, gallons of water per square foot per minute.

Additional details of suitable sheet filter materials are disclosed in U.S. Pat. No. 6,848,868 and the other US patents which are incorporated herein by reference.

When the laminar sheet material includes first and second sheet materials, or a first and/or second sheet material and an additional sheet material, the sheets can be secured to each other in any convenient way, for example by intermittent spot welding, sewing or stapling.

The laminar sheet comprises a central portion, a first side edge portion, a second side edge portion, a front edge portion and a rear edge portion. These different portions will often be part of the same laminar sheet, with or without the additional sheet of filter material, so that the edge portions have the same construction as the central portion.

In one embodiment, the central portion of the self-supporting laminar sheet is in the form of a broad peripheral border which (i) surrounds an opening which (a) is not covered by the laminar sheet and when the drain cover assembly is in use, is open to the drain, and (ii) is surrounded by an internal gasket. This embodiment is particularly useful when large water flows are expected, because the opening in the self-supporting laminar sheet enables water to enter directly into the drain. The area of the opening can be for example 0.1-0.3 times the area of the peripheral border surrounding the opening.

The preferred size of the laminar sheet is determined by the size of the drain to be protected, and, when relevant, the largest size that can be conveniently shipped. The laminar sheet will normally cover the entire drain, but it may extend beyond the drain on one or more sides. For rectangular (including square) drains, the length of each side will often be 2-6 feet, e.g. 2-4 feet. For long thin drains (e.g. slot drains and trench drains), the laminar sheet may for example be 4-9 inches wide and up to 7 feet wide. When necessary or convenient, two or more drain cover assemblies can be used together for very large drains.

The Edge Gaskets.

In most cases, each of the edge gaskets, in use, bridges the junction between an edge of the drain and a hard surface bordering the drain. However, it is also possible for the whole of the edge gasket to be over the adjacent hard surface. As noted above, the drain cover assembly may have two, three or four edge gaskets, depending upon the type of drain which is to be protected. Each gasket has an inner gasket portion and an outer gasket portion.

The inner gasket portion contacts and lies over or under an edge portion of the laminar sheet and preferably is secured to the top or the bottom of the laminar sheet, for example by sewing. In use, preferably (i) all the inner gasket portion lies over the drain itself or (ii) part of the inner gasket portion lies over the drain and part lies over the hard surface which borders the drain. However it is also possible for the entire inner gasket portion to lie over the hard surface which borders the drain. The inner gasket portion can for example be 0.5-5.0 inches, for example 2-5 inches, preferably 3-4 inches, wide.

The outer gasket portion extends away from the inner gasket portion and away from the edge of the laminar sheet. In use, at least part of the outer gasket portion contacts the hard surface which borders the drain. The outer gasket portion can for example be 3-10 inches, preferably 5-7 inches, wide.

The gaskets are preferably composed of a porous nonwoven fabric, for example a melt blown nonwoven fabric, particularly a melt blown polypropylene nonwoven fabric. The fabric can for example have a thickness of 0.01-0.5 inch, preferably 0.1-0.4 inch, e.g. 0.2-0.3 inch. Suitable materials for the gasket are commercially available as geotextile fabrics having a weight of 10-16 ounces per square yard. We have found that the use of a porous nonwoven fabric is advantageous because the outer portion of the gasket, at least part of which contacts the hard surface adjacent the drain, adapts to and clings closely to most hard surfaces, particularly when the gasket is wet. However, the bond between the gasket and the hard surface adjacent the drain can be easily ruptured by pulling the gasket away from the hard surface.

Other materials can be used for the gaskets, for example in gaskets in which the underside of the outer gasket portion is coated with a material that adheres to the hard surface adjacent the drain. The gasket is preferably composed of a single strip of a single fabric, but can comprise two or more different fabrics or materials.

The total horizontal width of the gasket can for example be 4-15 inches, preferably 6-12 inches. The widths of the inner and outer gasket portions can be the same or different.

In the assemblies in which there are three or four gaskets attached to edge portions of the laminar sheet, the gaskets are preferably joined together at the corners of the laminar sheet, preferably by sewing and/or staples, optionally using auxiliary pieces of the same or different fabric to secure the corner together.

In the assemblies in which there are only two gaskets attached to opposite edge portions of the laminar sheet, each end of each gasket preferably extends beyond the laminar sheet.

Berms on the Gaskets.

Each gasket preferably comprises an upstanding berm which (i) is between the inner gasket portion and the outer gasket portion and (ii) extends upwards away from the inner gasket portion and the outer gasket portion. In use, the berm is parallel to an edge of the laminar sheet and when a strong flow of liquid approaches the drain, the berm interrupts the liquid flow and lessens the amount of entrained solids in the liquid passing into the drain, thus increasing the likelihood that the drain will function efficiently.

The height of the berm can for example be 0.01-5.0 inch, preferably 1-3 inch, e.g. about 1.5 inch. The height of the berm is preferably selected with a view to the expected water flows approaching the drain. When the surface surrounding the drain is flat, it can be best to have only a very shallow berm or no berm at all, to avoid flooding the surface surrounding the drain when there is heavy rainfall.

When the gasket is composed of a fabric, preferably a nonwoven fabric, the berm can conveniently be made by folding a strip of the fabric lengthways and sewing a lengthways seam between the two sides of the fabric, with the distance of the seam from the tip of the fold being approximately the desired height of the berm. The fabric can then be flattened so that the inner and outer gasket portions are horizontal and a berm of the desired height extends upwards from them. The gasket can then be secured to the laminar sheet.

Internal Gaskets.

As noted above, in one embodiment of the invention, the central portion of the self-supporting laminar sheet is in the form of a broad peripheral border which (i) surrounds an opening which (a) is not covered by the laminar sheet and when the drain cover assembly is in use, is open to the drain, and (ii) is surrounded by an internal gasket. The internal gaskets surrounding the opening can be the same as the edge gaskets described above, with the inner gasket portion secured to the laminar sheet, but they do not need to have outer gasket portion.

The Drawings.

In the drawings, the following numerals are used to denote different components of the assemblies.

1 denotes a laminar sheet which is composed of first and second sheet materials 11 and 12 and, sandwiched between the sheet materials 11 and 12, an additional sheet material 13.

2 denotes a gasket which comprises an inner gasket portion 21, an outer gasket portion 22, and an upstanding berm 23 formed by folding a strip of a porous nonwoven fabric and securing the fold by means of stitches 231.

3 denotes a drain.

4 denotes a hard surface bordering the drain.

15 denotes a rear edge portion of the laminar sheet which extends upwards from the central portion of the laminar sheet and can cover at least part of an opening in a curb of a sidewalk 5.

6 denotes an internal gasket which (i) comprises an inner gasket portion 62 and an upstanding berm 63, and (ii) surrounds an opening 7 in the self-supporting laminar sheet, the opening being defined by a peripheral border portion 8 of the self-supporting sheet.

Referring now to FIG. 1, each of the first and second sheet materials 11 and 12 is an apertured polymeric sheet material having relatively large apertures therethrough, and the additional sheet material 13 is a sheet material having relatively small apertures therethrough, for example a conventional filter material which retains at least some of the sediment contained in a sediment-containing liquid placed on top of the drain cover. As noted above, in some embodiments of the invention, part or all of the self-supporting sheet material comprises three sheet materials as shown in FIG. 1. In other embodiments of the invention, the self-supporting sheet material consists essentially of a single apertured polymeric sheet or two or more apertured polymeric sheets having apertures which allow sediment to pass through the sheet material into the drain.

Figure 2:
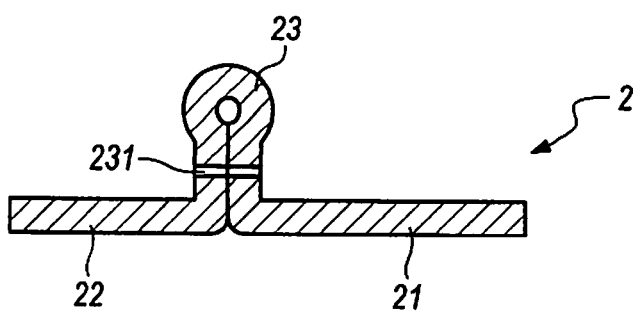
FIG. 2 is a partial cross-section of an edge gasket for use in the invention.

Referring now to FIG. 2, the gasket is formed from a strip of a porous nonwoven fabric which has first been folded lengthways at an intermediate point, optionally at a midpoint of the strip, has then been sewn along the length of the fold, and finally has been flattened into the shape shown in FIG. 2.

Figure 3:
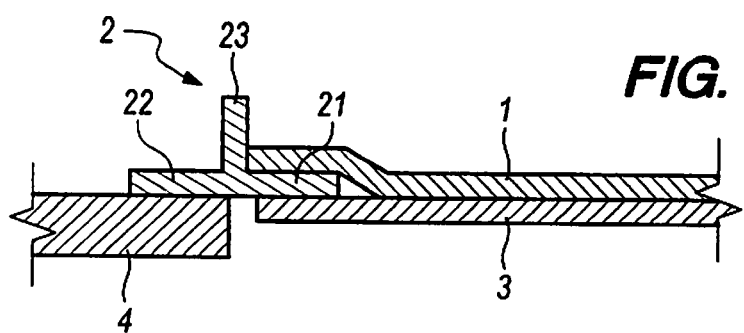
FIGS. 3-7 are partial cross-sections of different covered drain assemblies of the invention.

Referring now to FIG. 3, this shows a gasket 2 bridging the gap between a drain 3 and a hard surface 4 bordering the drain. The inner gasket portion 21 is secured underneath the laminar sheet 1 and rests on the drain, and the outer gasket portion 22 rests on the hard surface 4.

Figure 4:
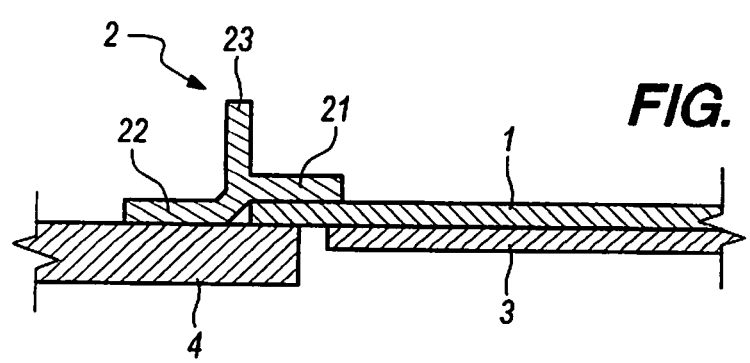

Referring now to FIG. 4, this is the same as FIG. 3 except that the inner gasket portion is secured on top of the laminar sheet 1.

Figure 5:
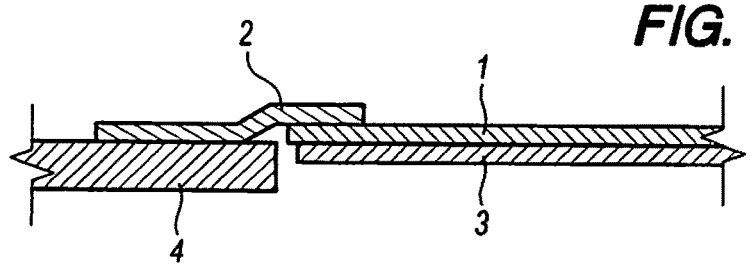

Referring now to FIG. 5, this is the same as FIG. 3, except that the gasket 2 does not have an upstanding berm.

Figure 6:
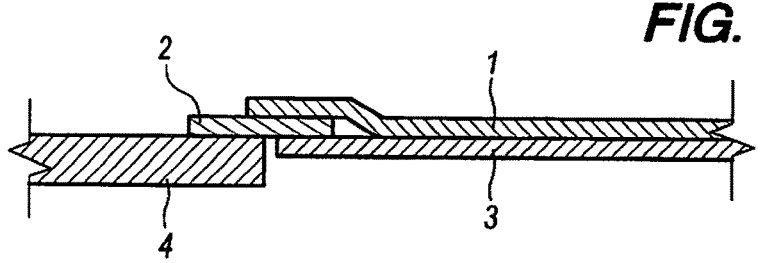

Referring now to FIG. 6, this is the same as FIG. 4, except that the gasket 2 does not have an upstanding berm.

Figure 7:
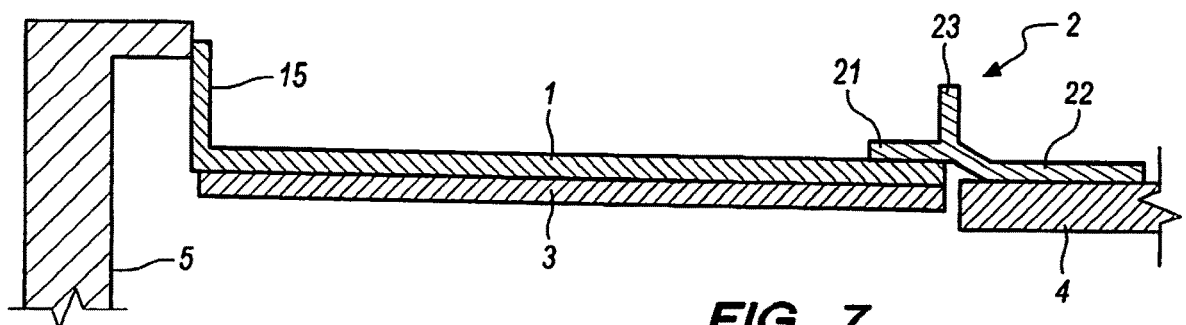

Referring now to FIG. 7, this shows a front gasket 2 bridging the gap between a drain 3 and a hard surface 4 bordering the drain, with the inner gasket portion 21 secured over the laminar sheet 1 which rests on the drain, and with the outer gasket portion 22 resting on the hard surface 4. A rear portion 15 of the laminar sheet extends upwards from the horizontal portion of the laminar sheet and covers an opening in the curb of a sidewalk 5. The rear portion of the laminar sheet can be secured in place by sandbags (not shown) at each end of the opening.

Figure 8:
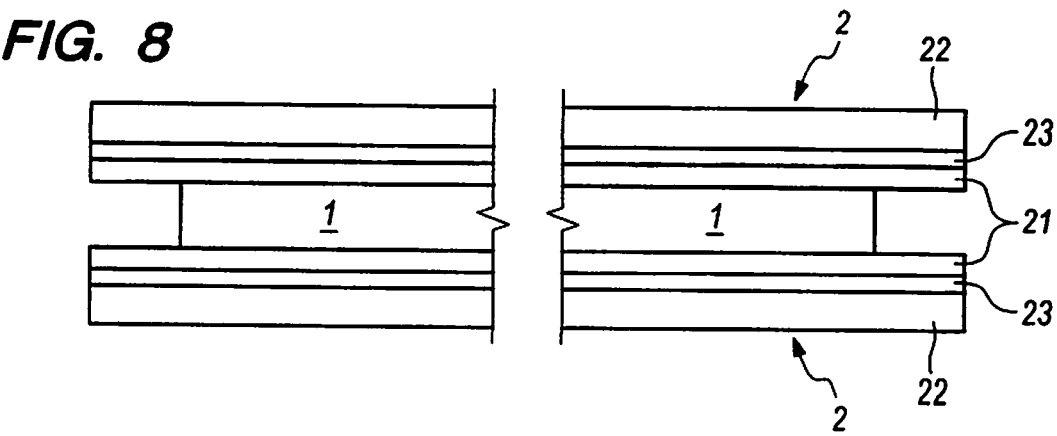
FIGS. 8-11 are plan views of different drain cover assemblies of the invention.

Referring now to FIG. 8, this shows a drain cover assembly which is suitable for the protection of a long thin drain. A gasket 2 is attached to each side of a long thin sheet 1, with the inner gasket portion 21 secured to the top of the laminar sheet 1. In use, the sheet 1 extends beyond the drain.

Figure 9:
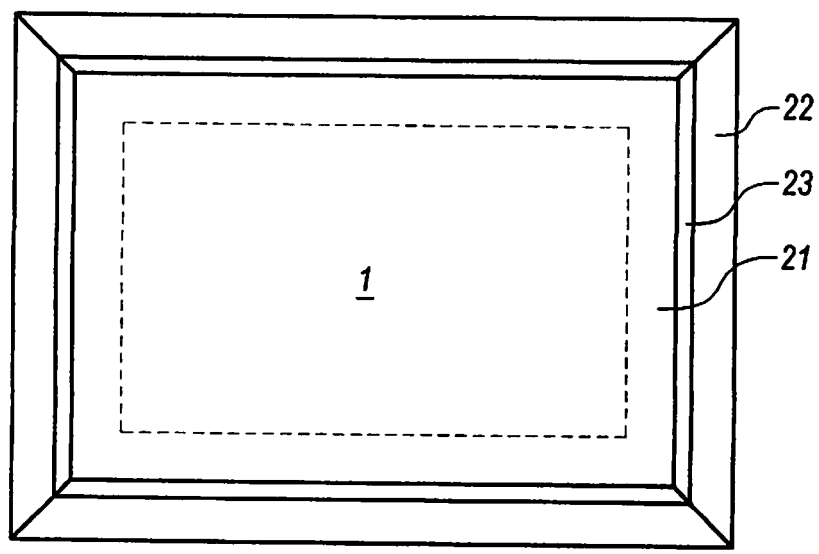

Referring now to FIG. 9, this shows a drain cover assembly which is suitable for the protection of a drain which is bordered on all sides by a hard surface. The assembly comprises four gaskets, one on each edge of the laminar sheet 1, each gasket having an upstanding berm 23, an inner gasket portion 21 secured underneath the laminar sheet 1 and an outer gasket portion 22 extending beyond the berm.

Figure 10:
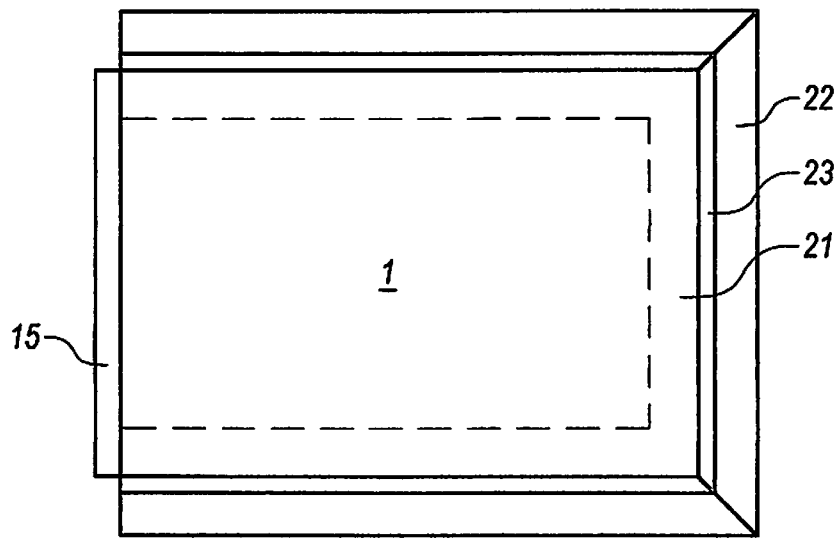

Referring now to FIG. 10, this shows a drain cover assembly which is suitable for the protection of a drain which is bordered at the front and on each side by a hard surface and which terminates at an opening in the curb of a sidewalk. The assembly comprises three gaskets, respectively at the sides and the front of the laminar sheet 1, each gasket having an upstanding berm 23, with the outer gasket portion 22 extending beyond the berm and the inner gasket portion 21 secured underneath the laminar sheet 1. The rear edge portion 15 of the laminar sheet extends upwards from the horizontal portion of the laminar sheet 1.

Figure 11:
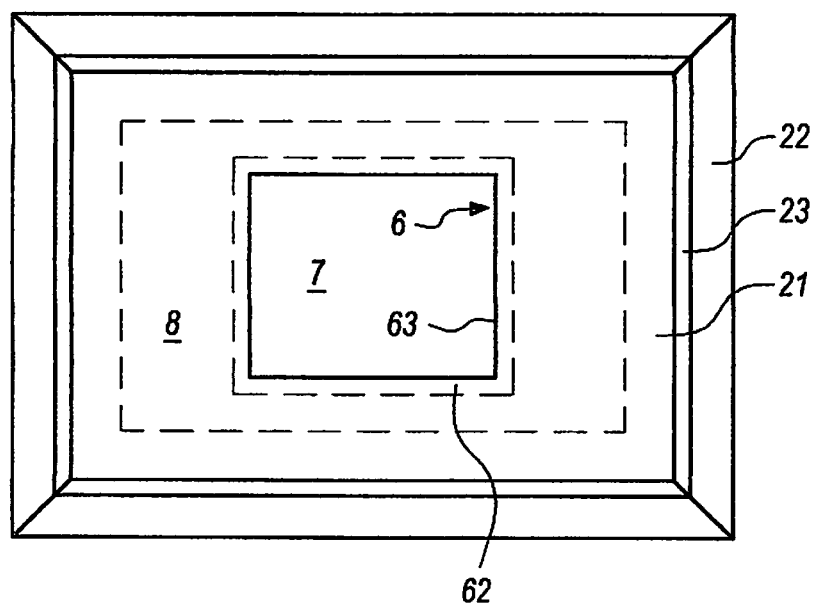

Referring now to FIG. 11, this shows a drain cover assembly which is suitable for the protection of a drain which is bordered on each side by a hard surface and which is likely to be subject to heavy flows of water. The assembly comprises four edge gaskets, one on each edge of the laminar sheet 1. Each gasket has an upstanding berm 23, an inner gasket portion 21 secured underneath the laminar sheet 1 and an outer gasket portion 22 extending beyond the berm. There is an opening 7 in the center of the self-supporting laminar sheet. The opening 7 is surrounded by an internal gasket 6 having an upstanding berm 63 and an internal gasket portion 62 which is secured to the self-supporting laminar sheet. The self-supporting laminar sheet is in the form of a peripheral border portion 8 surrounding the opening.

The invention claimed is:

1. A drain cover assembly which can be placed over a drain in the road and which comprises
    (A) a self-supporting laminar sheet which comprises
        (1) a central portion comprising an apertured sheet material comprising apertures which allow water to pass through the central portion,
        (2) a first side edge portion which contacts and extends from one side of the central portion,
        (3) a second edge portion which contacts and extends from an opposite side of the central portion,
        (4) a front edge portion which (i) contacts and extends from a front edge of the central portion and (ii) is attached to the first and second edge portions,
        (5) a rear edge portion which (i) contacts and extends from a rear edge of the central portion and (ii) is attached to the first and second edge portions;
    (B) a first side edge gasket which comprises (i) an inner gasket portion which contacts and lies over or under the first side edge portion of the laminar sheet and (ii) an outer gasket portion which extends away from the first side edge portion of the laminar sheet; and
    (C) a second side edge gasket which comprises (i) an inner gasket portion which contacts and lies over or under the second side edge portion of the laminar sheet and (ii) an outer gasket portion which extends away from the second side edge portion of the laminar sheet;
    wherein each of the side edge gasket and the second side edge gasket comprises an upstanding berm which (i) is parallel to an edge of the central portion of the laminar sheet, (ii) is between the inner gasket portion and the outer gasket portion of the gasket, and (iii) extends upwards away from the inner gasket portion and the outer gasket portion; and
    wherein the central portion of the laminar sheet comprises, in addition to the first sheet material which has relatively large apertures therethrough, a second sheet material which has relatively small apertures therethrough and which extends over only apart of the area of the central portion of the laminar sheet.

2. A drain cover assembly according to claim 1 which also comprises
    (D) a front edge gasket which (i) comprises an inner gasket portion which contacts and lies over or under the front edge portion of the laminar sheet, (ii) comprises an outer gasket portion which extends away from the front edge portion of the laminar sheet and (iii) contacts the first side edge gasket and the second side edge gasket;
    wherein each of the side edge gasket, the second side edge gasket and the front edge gasket comprises an upstanding berm which (i) is parallel to an edge of the central portion of the laminar sheet, (ii) is between the inner gasket portion and the outer gasket portion of the gasket, and (iii) extends upwards away from the inner gasket portion and the outer gasket portion.

3. A protected drain assembly which comprises
    (1) a drain which (i) is bordered by a hard surface on the front and on each side, and (ii) has a rear section underneath an opening in a curb of a sidewalk, and
    (2) a drain cover assembly according to claim 2,
    wherein
    (a) a rear edge portion of the laminar sheet extends upwards from the central portion of the laminar sheet and covers at least part of the opening in the curb of the sidewalk,
    (b) at least part of the inner gasket portion of the front edge gasket is over the drain or over a part of the hard surface which surrounds the drain, and
    (c) at least part of the outer gasket portion of the front edge gasket contacts a part of the hard surface which surrounds the drain.

4. A drain cover assembly according to claim 2 wherein each of the gaskets comprises a geotextile fabric having a weight of 10-16 ounces per square yard.

5. A drain cover assembly according to claim 1 wherein each of the gaskets comprises a geotextile fabric having a weight of 10-16 ounces per square yard.

6. A drain cover assembly according to claim 1 wherein the height of each of the berms is 1-3 inch.

7. A drain cover assembly according to claim 1 wherein the horizontal width of each of the gaskets is 4-15 inch.

8. A drain cover assembly according to claim 1 wherein the horizontal width of each of the gaskets is 6-12 inch.

9. A drain cover assembly according to claim 1 in which there are only two gaskets attached to opposite edge portions of the laminar sheet, and each end of each gasket extends beyond the laminar sheet.

10. A drain cover assembly according to claim 9 wherein the height of each of the berms is 1-3 inch.

11. A drain cover assembly according to claim 10 wherein the horizontal width of each of the gaskets is 6-12 inch.

12. A drain cover assembly according to claim 2 wherein the height of each of the berms is 1-3 inch.

13. A drain cover assembly according to claim 2 wherein the horizontal width of each of the gaskets is 6-12 inch.

14. A drain cover assembly according to claim 1 which also comprises
    (D) a front edge gasket which (i) comprises an inner gasket portion which contacts and lies over or under the front edge portion of the laminar sheet, (ii) comprises an outer gasket portion which extends away from the front edge portion of the laminar sheet and (iii) contacts the first side edge gasket and the second side edge gasket; and (E) a rear edge gasket which (i) comprises an inner gasket portion which contacts and lies over or under the rear edge portion of the laminar sheet, (ii) comprises an outer gasket portion which extends away from the front edge portion of the laminar sheet and (iii) contacts the first side edge gasket and the second side edge gasket;

wherein each of the side edge gasket, the second side edge gasket, the front edge gasket and the rear edge gasket (a) includes an upstanding berm which (i) is parallel to an edge of the central portion of the laminar sheet, (ii) is between the inner gasket portion and the outer gasket portion, and (iii) extends upwards away from the inner gasket portion and the outer gasket portion, and (b) has two ends, each of which is joined at a corner of the laminar sheet to another gasket so that the upstanding berm continuously surrounds the laminar sheet.

15. A protected drain assembly which comprises
(1) a drain which is surrounded on each side by a hard surface, and
(2) a drain cover assembly as claimed in claim 14,
wherein
(a) the central portion of the laminar sheet is supported by the drain,
(b) at least part of the inner gasket portion of the front edge gasket is over the drain or over a part of the hard surface which surrounds the drain,
(c) at least part of the outer gasket portion of the front edge gasket contacts a part of the hard surface which surrounds the drain,
(d) at least part of the inner gasket portion of the rear edge gasket is over the drain or over a part of the hard surface which surrounds the drain, and
(e) at least part of the outer gasket portion of the rear edge gasket contacts a part of the hard surface which surrounds the drain.

16. A drain cover assembly which can be placed over a drain in the road and which comprises
(A) a self-supporting laminar sheet which comprises
(1) a central portion comprising (i) a first apertured sheet material comprising apertures which allow water to pass through the central portion and (ii) a second apertured sheet material which has relatively small apertures therethrough and which extends over only a part of the area of the laminar sheet,
(2) a first side edge portion which contacts and extends from one side of the central portion,
(3) a second edge portion which contacts and extends from an opposite side of the central portion,
(4) a front edge portion which (i) contacts and extends from a front edge of the central portion and (ii) is attached to the first and second edge portions,
(5) a rear edge portion which (i) contacts and extends from a rear edge of the central portion and (ii) is attached to the first and second edge portions;
(B) a first side edge gasket which comprises (i) an inner gasket portion which contacts and lies over or under the first side edge portion of the laminar sheet and (ii) an outer gasket portion which extends away from the first side edge portion of the laminar sheet;
(C) a second side edge gasket which comprises (i) an inner gasket portion which contacts and lies over or under the second side edge portion of the laminar sheet and (ii) an outer gasket portion which extends away from the second side edge portion of the laminar sheet;

(D) a front edge gasket which (i) comprises an inner gasket portion which contacts and lies over or under the front edge portion of the laminar sheet, (ii) comprises an outer gasket portion which extends away from the front edge portion of the laminar sheet and (iii) contacts the first side edge gasket and the second side edge gasket; and (E) a rear edge gasket which (i) comprises an inner gasket portion which contacts and lies over or under the rear edge portion of the laminar sheet, (ii) comprises an outer gasket portion which extends away from the front edge portion of the laminar sheet and (iii) contacts the first side edge gasket and the second side edge gasket;

wherein
(i) each of the side edge gasket, the second side edge gasket, the front edge gasket and the rear edge gasket
(a) includes an upstanding berm which (i) is parallel to an edge of the central portion of the laminar sheet, (ii) is between the inner gasket portion and the outer gasket portion, (iii) extends upwards away from the inner gasket portion and the outer gasket portion, and (iii) has a height of 1-3 inch, and
(b) has two ends, each of which is joined at a corner of the laminar sheet to another gasket so that the upstanding berm continuously surrounds the laminar sheet; and
(ii) the central portion of the laminar sheet comprises, in addition to the first sheet material which has relatively large apertures therethrough, a second sheet material which has relatively small apertures therethrough and which extends over a part only of the area of the central portion of the laminar sheet.

17. A drain cover assembly according to claim 16 wherein each of the gaskets comprises a geotextile fabric having a weight of 10-16 ounces per square yard.

18. A protected drain assembly which comprises
(1) a drain which is surrounded on each side by a hard surface, and
(2) a drain cover assembly as claimed in claim 16;
wherein
(a) the central portion of the laminar sheet is supported by the drain,
(b) at least part of the inner gasket portion of the front edge gasket is over the drain or over a part of the hard surface which surrounds the drain,
(c) at least part of the outer gasket portion of the front edge gasket contacts a part of the hard surface which surrounds the drain,
(d) at least part of the inner gasket portion of the rear edge gasket is over the drain or over a part of the hard surface which surrounds the drain, and
(e) at least part of the outer gasket portion of the rear edge gasket contacts a part of the hard surface which surrounds the drain.

19. A drain cover assembly according to claim 16 wherein each of the gaskets comprises a geotextile fabric having a weight of 10-16 ounces per square yard.

20. A drain cover assembly according to claim 16 wherein the horizontal width of each of the gaskets is 6-12 inch.

* * * * *